US010566012B1

United States Patent
Basye et al.

(10) Patent No.: US 10,566,012 B1
(45) Date of Patent: Feb. 18, 2020

(54) DIRECTION BASED END-POINTING FOR SPEECH RECOGNITION

(71) Applicant: Amazon Technologies, Inc., Seattle, WA (US)

(72) Inventors: Kenneth John Basye, Sutton, MA (US); Jeffrey Penrod Adams, Tyngsborough, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/158,775

(22) Filed: Oct. 12, 2018

Related U.S. Application Data

(63) Continuation of application No. 13/775,954, filed on Feb. 25, 2013, now Pat. No. 10,102,850.

(51) Int. Cl.
*G10L 15/22* (2006.01)
*G06F 3/00* (2006.01)
*G10L 25/87* (2013.01)
*G10L 15/00* (2013.01)
*G10L 25/78* (2013.01)
*G10L 21/0216* (2013.01)

(52) U.S. Cl.
CPC ............ *G10L 25/87* (2013.01); *G10L 15/00* (2013.01); *G10L 25/78* (2013.01); *G10L 2021/02166* (2013.01)

(58) Field of Classification Search
CPC ................................. G10L 15/22; G06F 3/167
See application file for complete search history.

(56) References Cited

U.S. PATENT DOCUMENTS

| | | | | |
|---|---|---|---|---|
| 8,744,849 | B2* | 6/2014 | Liao | G10L 15/20 704/233 |
| 10,102,850 | B1* | 10/2018 | Basye | G10L 15/00 |
| 2007/0198268 | A1* | 8/2007 | Hennecke | G10L 15/22 704/270 |
| 2008/0270131 | A1* | 10/2008 | Fukuda | G10L 21/0272 704/246 |
| 2008/0298602 | A1* | 12/2008 | Wolff | H04M 9/082 381/66 |
| 2009/0254342 | A1* | 10/2009 | Buck | G10L 15/222 704/233 |
| 2010/0020980 | A1* | 1/2010 | Kim | G10K 11/175 381/71.1 |
| 2010/0026780 | A1* | 2/2010 | Tico | G10L 21/0208 348/14.02 |
| 2010/0046770 | A1* | 2/2010 | Chan | H04R 3/005 381/92 |
| 2010/0217590 | A1* | 8/2010 | Nemer | G01S 3/8006 704/233 |

(Continued)

*Primary Examiner* — Shreyans A Patel
(74) *Attorney, Agent, or Firm* — Pierce Atwood LLP

(57) ABSTRACT

A speech recognition system utilizing automatic speech recognition techniques such as end-pointing techniques in conjunction with beamforming and/or signal processing to isolate speech from one or more speaking users from multiple received audio signals and to detect the beginning and/or end of the speech based at least in part on the isolation. Audio capture devices such as microphones may be arranged in a beamforming array to receive the multiple audio signals. Multiple audio sources including speech may be identified in different beams and processed.

20 Claims, 5 Drawing Sheets

(56) References Cited

U.S. PATENT DOCUMENTS

| | | | |
|---|---|---|---|
| 2011/0063405 A1* | 3/2011 | Yam | H04M 9/082 |
| | | | 348/14.08 |
| 2011/0075859 A1* | 3/2011 | Kim | H04R 3/005 |
| | | | 381/92 |
| 2011/0096915 A1* | 4/2011 | Nemer | H04M 3/568 |
| | | | 379/158 |
| 2011/0224980 A1* | 9/2011 | Nakadai | G10L 15/20 |
| | | | 704/233 |
| 2011/0285807 A1* | 11/2011 | Feng | G06K 9/00228 |
| | | | 348/14.08 |
| 2011/0285808 A1* | 11/2011 | Feng | H04N 7/142 |
| | | | 348/14.09 |
| 2011/0285809 A1* | 11/2011 | Feng | G06K 9/00234 |
| | | | 348/14.16 |
| 2011/0300929 A1* | 12/2011 | Tardif | A63F 13/213 |
| | | | 463/30 |
| 2011/0301953 A1* | 12/2011 | Lee | G10L 15/07 |
| | | | 704/243 |
| 2012/0020480 A1* | 1/2012 | Visser | H04R 3/12 |
| | | | 381/17 |
| 2012/0027217 A1* | 2/2012 | Jun | H04S 7/30 |
| | | | 381/58 |
| 2012/0134507 A1* | 5/2012 | Dimitriadis | H04R 3/00 |
| | | | 381/92 |
| 2013/0082875 A1* | 4/2013 | Sorensen | G10K 11/34 |
| | | | 342/368 |
| 2013/0300648 A1* | 11/2013 | Kim | G06F 3/011 |
| | | | 345/156 |

* cited by examiner

DIRECTION BASED END-POINTING FOR SPEECH RECOGNITION

This application is a continuation of, and claims priority to, U.S. patent application Ser. No. 13/775,954, entitled "DIRECTION BASED END-POINTING FOR SPEECH RECOGNITION," filed on Feb. 25, 2013, in the names of Kenneth John Basye et al., and scheduled to issue as U.S. Pat. No. 10,102,850, on Oct. 16, 2018. The above application is hereby incorporated by reference in its entirety.

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with language processing techniques may allow a user to control a computing device to perform tasks based on the user's spoken commands. Speech recognition may also convert a user's speech into text data, which may then be provided to various textual based programs and applications.

Speech recognition may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) techniques enable a user to speak into an audio capture device (e.g., audio input/capture element and/or microphone) and have audio signals including speech translated into a command that is recognized by an ASR device. While audio input to a device may include speech from one or more users, it may also include background noise such as audio from other sources (e.g. other individuals, background audio from appliances, etc.). Audio from these other sources may make it more difficult for an ASR device to interpret speech from a user for processing, particularly when determining when the user has stopped speaking so an ASR process may terminate.

An ASR device may use beamforming techniques, described below, to isolate desired audio, such as speech from a user, and remove undesired audio. Other techniques beyond beamforming, such as reverberation, echo cancellation, and other techniques, may also be used to improve the reception of the desired audio. Once the user's speech is isolated, end-pointing techniques may be used to identify when a desired speech sequence or utterance has ended, thereby ending ASR processing for that particular utterance.

Beamforming is a process of isolating certain audio inputs through the use of multiple audio input devices, such as an array of microphones. Data processing techniques may be employed to "focus" the array of microphones on sound coming from a particular direction, known as a beam. In some aspects of the disclosure, the microphones may be arranged as illustrated in FIG. 1A or FIG. 1B.

Figure 1A:
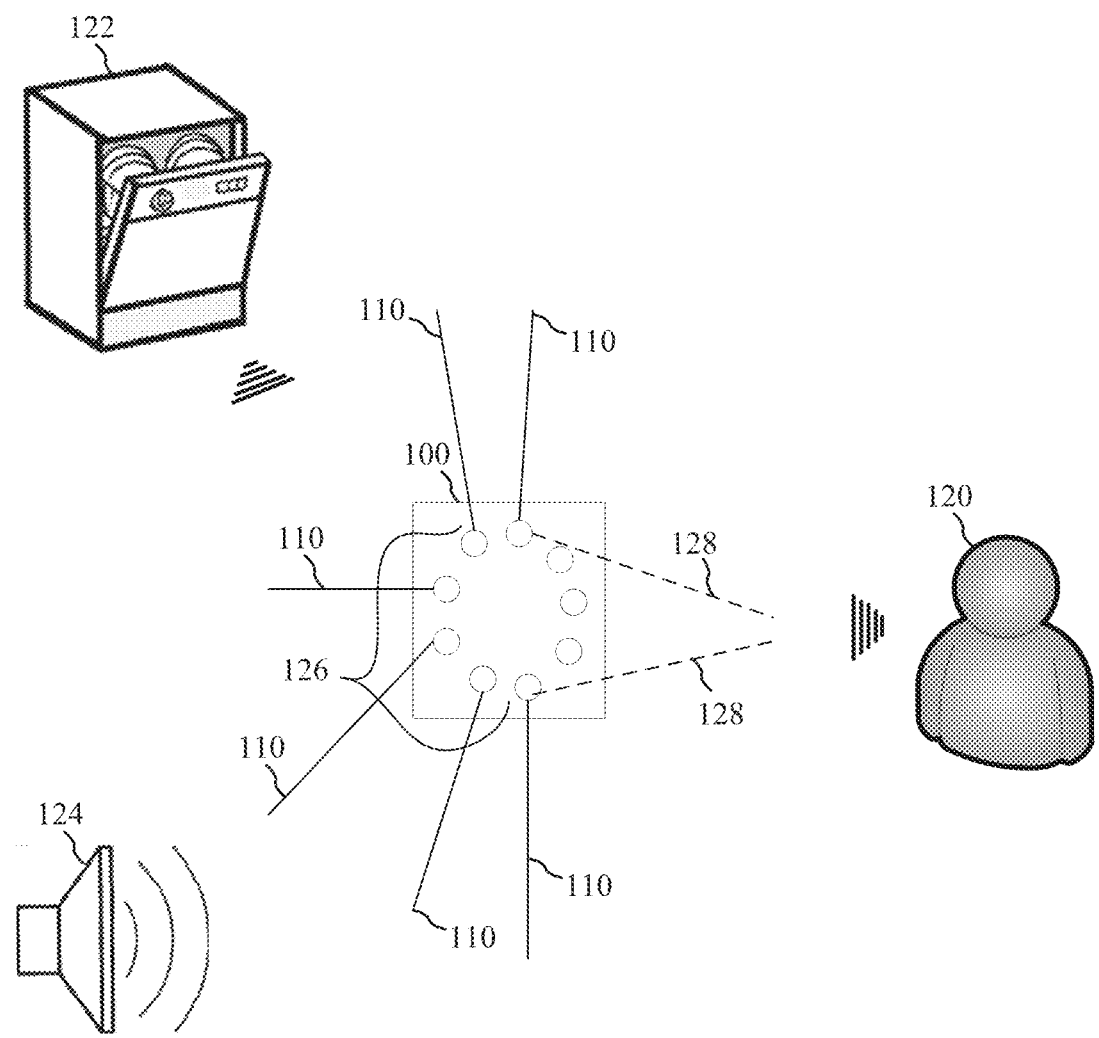
FIG. 1A illustrates an automatic speech recognition (ASR) device having a circular microphone array positioned among various audio emitting sources according to one aspect of the present disclosure.
Figure 1B:
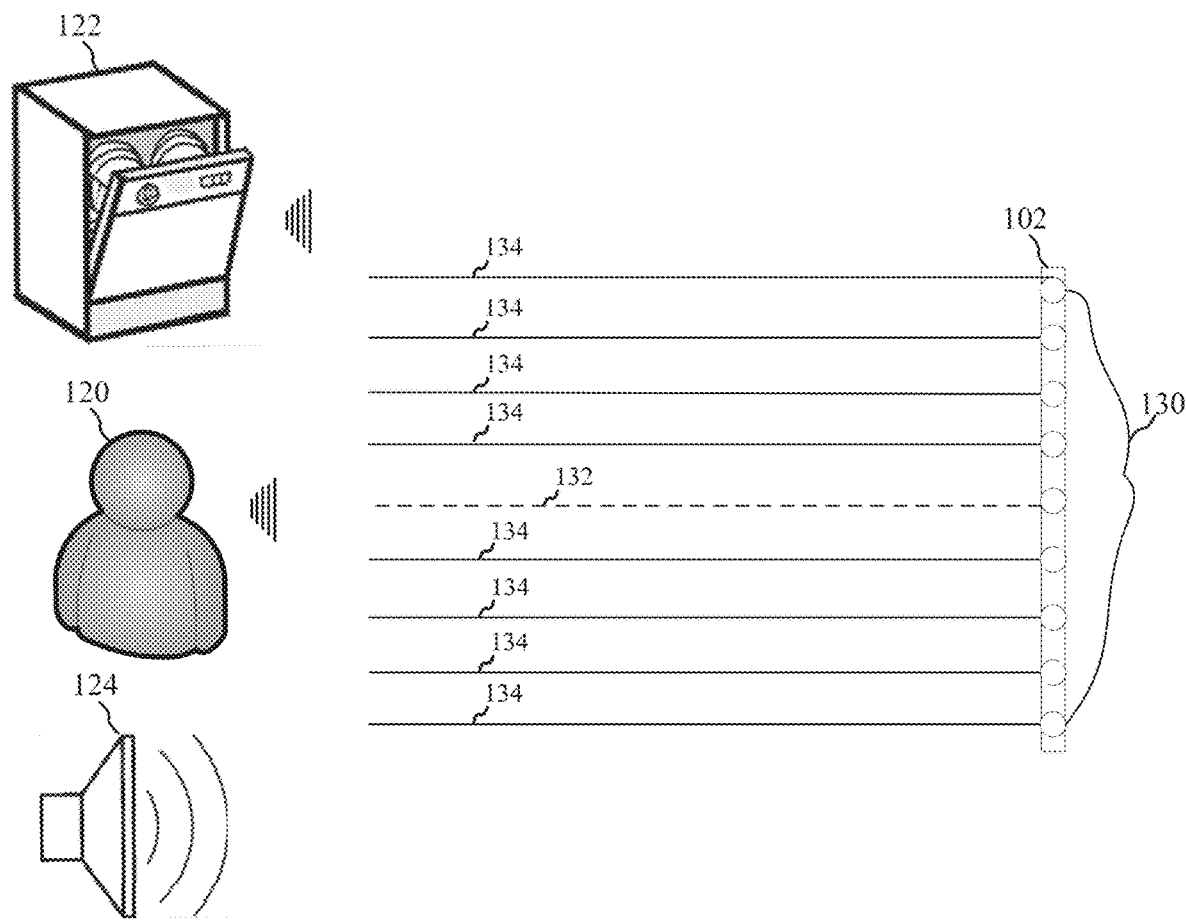
FIG. 1B illustrates an ASR device having a linear microphone array positioned among various audio emitting sources according to one aspect of the present disclosure.

FIG. 1A illustrates an ASR device 100 having a circular microphone array 126 with a user 120, a dishwasher 122 and a stereo speaker 124, positioned around the ASR device 100. The ASR device 100 may receive spoken utterances for ASR processing from the user 120. The device 100 may also receive audio from other noise sources such as the dishwasher 122 or the speaker 124. A number of beams, illustrated by lines 110, represent directions from which audio may enter the various microphones of the array. The microphone array 126 may be fixed or steerable. When steerable, the array 126 may allow for electronic focusing, or steering, of a beam based on audio signals received by the circular microphone array. Such steering may be used to isolate the user's speech by focusing the audio processing on audio received from the position of the user 120. Steering the beam may be accomplished by beamforming and/or signal processing techniques based on mathematical operations or algorithms. The beamforming and/or signal processing techniques facilitate isolating speech from the speaking user while deemphasizing audio from the dishwasher 122 and/or the audio speaker 124. For example, when the user 120 is speaking at the same time the dishwasher 122 is running and/or sound is transmitted from the speaker 124, the ASR device 100 may detect all of the audio sources and identify the speech from the user 120. The device may then steer the beam by focusing its audio processing on audio away from undesired beams 110 and toward audio received between the dashed lines 128, which is where the speaking user 120 is located.

In addition, one or more filters, (e.g., Kalman filters) may be used in conjunction with the beam forming techniques to isolate the speech from the user 120. For example, a filter may implement a least means squared analysis to optimize or improve delay associated with the circular microphone array 126. This implementation may facilitate the isolation of the speech by filtering audio signals from secondary users/sources such as noise from the dishwasher 122 and the audio speaker 124.

In another aspect, an ASR device may employ a linear microphone array for beamforming. FIG. 1B illustrates an ASR device 100 having such a linear microphone array 130. Also illustrated are the speaking user 120, the dishwasher 122 and the stereo speaker 124, positioned at various positions around the ASR device 100. The microphone array 130 may be fixed or steerable. When fixed, the array 130 may select for processing a particular beam, typically the beam featuring the loudest audio source, without employing steering techniques. Beams for the array are illustrated by lines 134. For example, the device may focus on the user 120 whose speech is being processed by the device 100. As illustrated in FIG. 1B, the audio generated by the user 120 may be detected most prominently by beam 132 of the fixed array 130. Similar to the circular microphone array, isolating desired audio signals using the linear microphone array may allow the ASR device 100 to use beamforming techniques and/or signal processing to isolate speech from one or more users and to determine an approximate direction, distance or relative position of a source of audio signals with respect to the ASR device 100. After isolating audio from the user 120, the ASR device 100 may determine a beginning or an end of the user's speech based on the isolated audio. The process of determining the beginning and/or end of a spoken utterance for ASR processing may be referred to as end-pointing, further described below.

Conventionally, when beamforming the loudest beam is selected for processing whether or not the loudest beam is associated with the speaking user 120. In the present application, beamforming techniques may be combined with ASR techniques to identify speech in one or more beams, and to ignore non-speech audio inputs, thereby isolating speech identified in the beams. In this manner a device may use beamforming techniques to separate certain audio beams from one another. A device may then employ ASR and/or signal processing techniques to isolate which beams include speech, and process the speech found in that beam(s). For example, in the illustrations of FIGS. 1A and 1B, the device may isolate the beam(s) including the speech of the user 120, even if other beams may include louder audio signals, such as beams including audio from a loud nearby dishwasher 122. Once isolated, the device may perform ASR on the audio including speech, including detecting the beginning and end of a particular utterance for processing.

Figure 2:
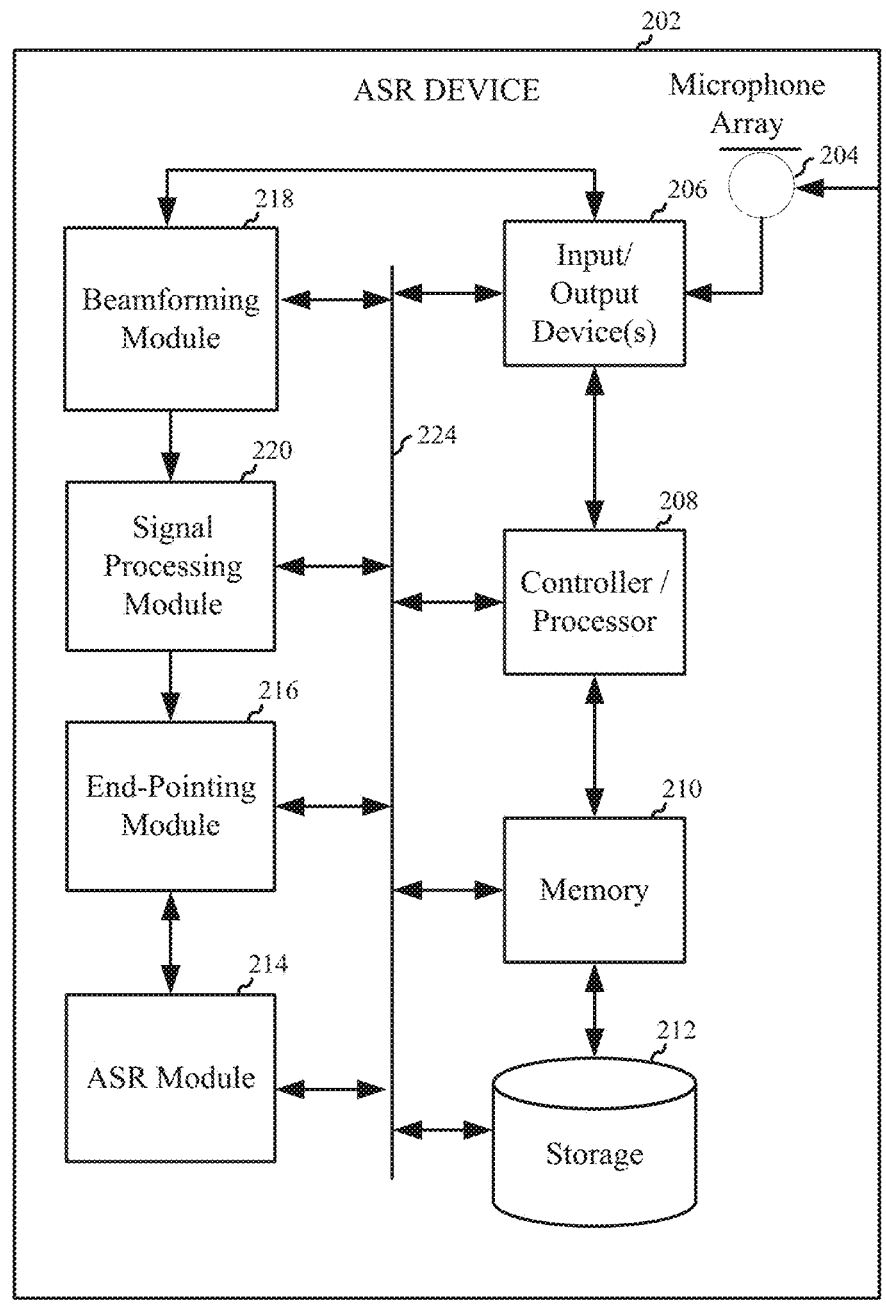
FIG. 2 is a block diagram conceptually illustrating an ASR device according to one aspect of the present disclosure.

FIG. 2 is a block diagram conceptually illustrating an ASR device 202 according to one aspect of the present disclosure. The ASR device 202 may be similar to the ASR device 100 described with respect to FIG. 1. The ASR device 202 may utilize audio signals received by an array of microphones in conjunction with beamforming and/or signal processing techniques to isolate speech or an utterance of a user from the audio signals and to determine a beginning and/or an end of a segment of the speech from a user. The ASR device 202 may also filter out undesired audio signals originating from other directions. Aspects of the present disclosure include computer-readable and computer-executable instructions that may reside on the ASR device 202. Although FIG. 2 illustrates a number of components that may be included in the ASR device 202, other non-illustrated components may also be included. In addition, some of the illustrated components may not be present in every device capable of employing aspects of the present disclosure. Further, some components that are illustrated in the ASR device 202 as a single component may also appear multiple times in a single device. For example, the ASR device 202 may include microphone arrays 204 or multiple controllers/processors 208.

Multiple ASR devices 202 may be employed in a single speech recognition system. In such a multi-device system, the ASR devices 202 may include different components for performing different aspects of the speech recognition process. The multiple devices may include overlapping components. The ASR device 202 as illustrated in FIG. 2 is exemplary, and may be a stand-alone device or may be included, in whole or in part, as a component of different devices or systems.

The teachings of the present disclosure may be applied within a number of different devices and computer systems, including, for example, general-purpose computing systems, server-client computing systems, mainframe computing systems, telephone computing systems, laptop computers, desktop computers, notebook computers, video gaming consoles, smart phone, electronic book reader, television set top boxes and portable media players, cellular phones, personal digital assistants (PDAs), tablet computers, other mobile devices, etc. The ASR device 202 may also be a component of other devices or systems that may provide speech recognition functionality such as automated teller machines (ATMs), kiosks, home appliances (such as refrigerators, ovens, etc.), vehicles (such as cars, busses, motorcycles, etc.), and/or exercise equipment, for example.

As illustrated in FIG. 2, the ASR device 202 may include an array of microphones 204 such as the circular or linear microphone array 126 or 130 for receiving spoken utterances for processing. The ASR device 202 may also include an address/data bus 224 for conveying data among components of the ASR device 202. Each component within the ASR device 202 may also be directly connected to other components in addition to (or instead of) being connected to other components across the bus 224. Although certain components are illustrated in FIG. 2 as directly connected, these connections are illustrative only and other components may be directly connected to each other (such as the ASR module 214 to the controller/processor 208).

The ASR device 202 may include a controller/processor 208 that may be a central processing unit (CPU) for processing data and computer-readable instructions and a memory 210 for storing data and instructions. The memory 210 may include volatile random access memory (RAM), non-volatile read only memory (ROM), and/or other types of memory. The ASR device 202 may also include a data storage component 212, for storing data and instructions. The data storage component 212 may include one or more storage types such as magnetic storage, optical storage, solid-state storage, etc. The ASR device 202 may also be connected to removable or external memory and/or storage (such as a removable memory card, memory key drive, networked storage, etc.) through the input/output device 206. Computer instructions for processing by the controller/processor 208 for operating the ASR device 202 and its various components may be executed by the controller/processor 208 and stored in the memory 210, storage 212, external device, or in memory/storage included in the ASR module 214 discussed below. Alternatively, some or all of the executable instructions may be embedded in hardware or firmware in addition to or instead of software. The teachings of this disclosure may be implemented in various combinations of software, firmware, and/or hardware, for example.

The ASR device 202 includes input/output device(s) 206. A variety of input/output device(s) may be included in the device. Example input devices include one or more audio capture devices, such as the array of microphones 204 (pictured as a separate component), a touch input device, keyboard, mouse, stylus or other input device. Example output devices include a visual display, tactile display, audio speakers, headphones, printer or other output device. The input/output device 206 may also include an interface for an external peripheral device connection such as universal serial bus (USB), FireWire, Thunderbolt or other connection protocol. The input/output device 206 may also include a network connection such as an Ethernet port, modem, etc. The input/output device 206 may also include a wireless communication device, such as radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, etc. Through the input/output device 206, the ASR device 202 may connect to a network, such as the Internet or private network, which may include a distributed computing environment.

Audio signals sent to the ASR module 214 may come from the array of microphones 204 or may be received by the input/output device 206, such as audio signals received by a remote entity and sent to the ASR device 202 over a network. The audio signals may also be sent to the ASR module from the beamforming module 218, signal processing module 220, or end-pointing module 216, which may be coupled to the ASR module either directly or through bus 224. In one aspect of the disclosure, multiple channels of audio may be transferred from the to the ASR module 214. The multiple channels may be used, for example, when processing two or more active speakers/users simultaneously. Audio signals may be in the form of a digitized representation of an audio waveform of spoken utterances. The sampling rate, filtering, and other aspects of the analog-to-digital conversion process may impact the overall quality of the audio signals. Various settings of the array of microphones 204 and input/output device 206 may be configured to adjust the audio signals based on traditional tradeoffs of quality versus data size or other considerations. Audio signals input into the ASR module 214 may be broken down into frames, with each frame representing a time interval of audio, for example 10 milliseconds (ms). Each frame may be represented by a set of values, called a feature vector, representing the features/qualities of the audio portion within the frame. In one aspect, each frame may include 10 ms to about 100 ms of audio signals received by the ASR device 202. The ASR device 202 may buffer a predetermined amount of the audio signals before processing.

In one aspect, at least one of the microphones is a directional microphone configured to receive audio signals emitted by a source and/or user in a specific direction relative to the ASR device 202. This feature allows the ASR device 202 to reduce the importance of audio signals received from sources positioned away from the directional microphone to isolate speech from a user. In other aspects, one or more microphones may be configured to receive audio signals from different directions at different times. For example, the one or more microphones may include multiple audio input elements, each of which can receive audio signals primarily from a different direction. The one or more microphones may receive audio signals primarily from a particular direction by receiving the audio signals using a single element or dynamically adjusting a weighting of each element. For example, the ASR device 202 may employ one or more algorithms for weighting the filtering of audio signals based on the relative position of a user. Various other approaches for receiving audio signals from various directions may be used as well within the scope of the various aspects of the disclosure.

In other aspects, a user may be deemed an active user when the user is closest to the ASR device 202 or centered with respect to a particular microphone or beam. For example, the ASR device 202 may be pointed towards a particular user or position, to identify the user in this position as an active user as long as that user is within a defined area with respect to one or more microphones of the ASR device 202.

The ASR device 202 may include an ASR module 214 for processing audio signals into text, for example. In some configurations, the ASR module 214 transcribes audio signals into text data representing the words of the speech contained in the audio signals. The text data may then be used by other components for various purposes, such as executing system commands, inputting data, etc. Audio signals including spoken utterances may be processed in real time or may be saved or buffered and processed at a later time. A spoken utterance or speech in the audio signals is input to the ASR module 214, which then interprets the utterance based on the similarity between the utterance and models known to the ASR module 214. For example, the ASR module 214 may compare the input audio signals with models for sounds (e.g., speech units or phonemes) and sequences of sounds to identify words that match the sequence of sounds spoken in the utterance of the audio signals. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Speech recognition may be performed by the ASR module 214 using a number of different models or techniques such as Hidden Markov Models (HMMs), Gaussian mixture models, Viterbi algorithms, etc. Based on the considered factors and the assigned recognition score, the ASR module 214 may output the most likely words recognized in the audio signals. The ASR module 214 may also output multiple alternative recognized words in the form of a lattice or an N-best list (for example). The ASR module 214 may be connected to the bus 224, input/output device(s) 206, array of microphones 204, beamforming module 218, signal processing module 220, end-pointing module 216 controller/processor 208 and/or other component of the ASR device 202.

Audio signals including the speech samples or speech feature vectors derived from the speech samples may be input to an end-pointing module 216. The end-pointing module 216, beamforming module 218 and/or signal processing module 220 may be implemented as hardware or software within the ASR device 202, such as software modules running in the controller/processor 208, resident/stored in the ASR module 214, one or more hardware modules coupled to the controller/processor 208, or some other variation. In certain implementations, the end-pointing module 216, beamforming module 218 and/or signal processing module 220 may be external but coupled to the ASR device 202, such as connected to a remote device.

The signal processing module 220 may be configured to identify or determine a segment of received audio that contains speech from a speaking user. The end-pointing module 216 may be configured to determine the beginning and/or end of a speech utterance. The end-pointing module 216 may be configured to divide an input audio signals such as spoken utterance into discrete sections, such as frames, so that the input audio signals may be analyzed on a frame-by-frame basis. Specific end-pointing techniques are described in more detail below.

Figure 3:
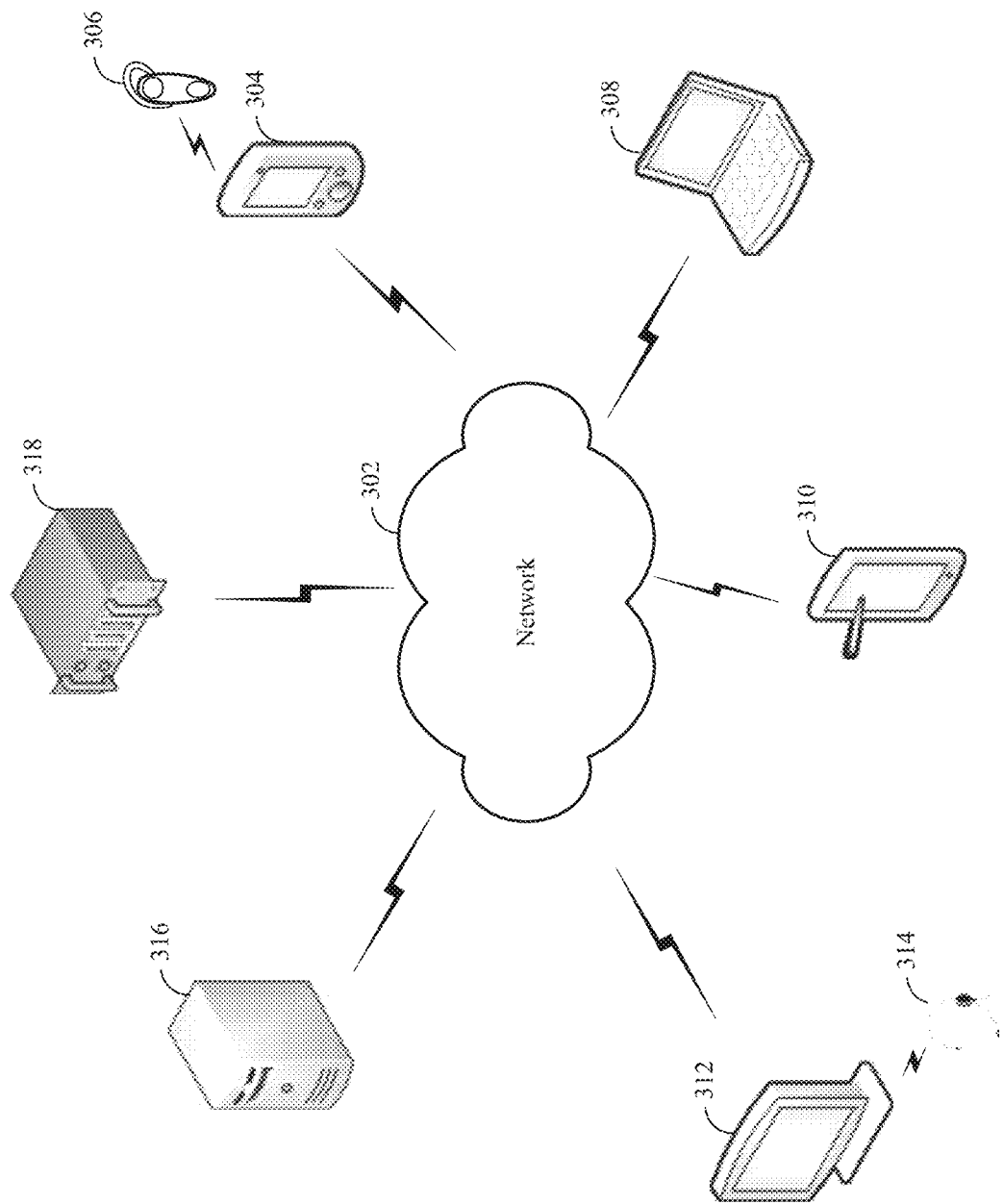
FIG. 3 illustrates a computer network for use with distributed speech recognition according to one aspect of the present disclosure.

Multiple devices, including multiple ASR device 100 or 202 may be connected over a network 302, as shown in FIG. 3. Network 302 may include a local or private network or may include a wide network such as the internet. Devices may be connected to the network 302 through either wired or wireless connections. For example, a wireless device 304 may be connected to the network 302 through a wireless service provider. Other devices, such as computer 312, may connect to the network 302 through a wired connection.

Other devices, such as laptop 308 or tablet computer 310 may be capable of connection to the network 302 using various connection methods including through a wireless service provider, over a WiFi connection, or the like. Networked devices may input spoken audio through a number of audio input devices including through a headset 306 or 314. Audio input devices may be connected to networked devices either through a wired or wireless connection. Networked devices may also include embedded audio input devices, such as an internal microphone (not shown) in the laptop 308, wireless device 304 or tablet computer 310.

In certain system configurations, one device may capture an audio signal and another device may perform the processing. For example, audio input to the headset 306 may be captured by wireless device 304 and sent over the network 302 to computer 316 or illustrated server 318 for processing. Alternatively, as described above, wireless device 304 may partially process the audio signal before sending it over the network 302 to the server for further processing. Because ASR processing may involve significant computational resources, in terms of both storage and processing power, such split configurations may be employed where the device capturing the audio has lower processing capabilities than a remote (e.g. server) device and higher quality ASR results are desired. The audio capture may occur near a user and the captured audio signal sent to another device for processing. In another aspect all or some portion of other processing (such as signal processing, beamforming, end-pointing, etc.) may be performed in whole or in part by a remote device connected to the ASR device 202, in some manner, such as through a network connection. The remote device may include certain components of the ASR device 202 and/or other components. In one aspect, a remote device may have greater computing resources than an ASR device 202 and some form of distributed processing may be configured to render the processes discussed herein more efficient, as may be desired.

Additionally, it should be noted that in some aspects, the functionality of the ASR device 100 and/or speech recognition server or ASR device 202 may be executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. One or more of the devices of the hosted computing environment may include distributed end-pointing as discussed herein.

In an ASR system, beamforming techniques may be applied to identify desired audio, such as speech, and separate that speech from undesired audio, such as background noise or other speakers. Endpointing techniques, that is techniques to identify the beginning and/or end of a speech utterance, may then be applied to beamformed audio. In this manner an utterance may be isolated from mixed audio inputs and processed according to ASR and/or other techniques.

Various techniques may be utilized to identify speech within beamformed audio data. One way to detect speech is based on the energy level of the received beamformed audio signals. The signal processing module 220 may perform audio detection processing, and/or the end-pointing module 216 may perform end-pointing, to determine an energy level of the received audio signals. In some aspects, the signal processing module 220 and/or end-pointing module 216 may include a digital signal processor (or other type of processor) configured to determine an energy level (such as a volume, intensity, amplitude, etc.) of the obtained audio signals and for comparing the energy level of the audio signals to an energy level threshold. The energy level threshold may be set based on user input, or may be set by a computing device. In some aspects, the signal processing module 220 and/or end-pointing module 216 may be further configured to determine that the received audio signals have an energy level satisfying a threshold for at least a threshold duration of time. In such aspects, high-energy audio inputs of relatively short duration, which may correspond to sudden noises or noise bursts that are relatively unlikely to include speech, may be ignored. The signal processing module 220 and/or end-pointing module 216 may compare the energy level to the energy level threshold (and optionally to the threshold duration) to determine whether the energy level threshold is met.

If the signal processing module 220 determines that the received audio signals have an energy level satisfying an energy level threshold it may process the audio signals to determine whether the audio signals include speech. Similarly the end-pointing module 216 may determine the beginning or end of an utterance based on an energy level threshold. In some aspects, the signal processing module 220 works in conjunction with the beamforming module 218 and/or end-pointing module 216 (or another processor or signal processor) to implement one or more techniques to determine whether the audio signals include speech. Some aspects may apply voice activity detection (VAD) techniques. Such techniques may determine whether speech is present in an audio input based on various quantitative aspects of the audio input, such as the spectral slope between one or more frames of the audio input signal; the energy levels of the audio input in one or more spectral bands; the signal-to-noise ratios of the audio input in one or more spectral bands; or other quantitative aspects. For example, the signal processing module 220 and/or end-pointing module 216 may focus its energy detection efforts on frequency bands typically associated with human speech, rather than audio bands. The signal processing module 220 and/or end-pointing module 216 may also identify evidence of voicing within received audio. This technique may also be referred to as pitch detection, where noise of a particular pitch is detected. Techniques for identifying voicing include identifying audio within specific frequency ranges, correlation functions, and the like. Pitch detection may also be used to distinguish particular speakers in a certain frequency range, which may substitute for more complex speaker identification processing.

In one aspect, the signal processing module 220 and/or end-pointing module 216 utilizes models for speech and non-speech. For example, HMM or GMM techniques may be applied to compare the audio signals to one or more acoustic models, which acoustic models may include models corresponding to speech, noise (such as environmental noise or background noise), or silence. If the input audio corresponds to a speech model, the ASR device 202 may process the audio as speech. The signal processing module 220 and/or end-pointing module 216 may use a speech isolation model and/or a classification model, which is based at least in part on multiple speech isolation models. In this implementation, a segment of speech in the audio signals is input to an ASR module (e.g., ASR module 214), for example, which then interprets the speech based on the similarity between the speech and models known to the ASR module. In some aspects, different sounds from different sources may be classified such that the model can identify the source of the sound. For example, the model may be configured to differentiate sounds from a shut door, dog barking, road bumps, dishwasher, door slams, thumps, cracks, engine noise, movement of air, etc. A classifier may be implemented by techniques such as linear classifiers, support vector machines, and decision trees. Other techniques, such as wakeword detection, may be used to determine whether speech, once identified through the end-pointing or other methods, is appropriate for ASR processing.

In another aspect, the ASR device 202 may perform end-pointing on the isolated audio signals based on a detected rapid change in a location of received audio. For example, if the ASR device 202 has identified a beam or relative position associated with a speaking user, and audio signals are no longer received from that particular beam/position, the end-pointing module 216 may determine that the user has stopped speaking and that the desired speech segment has concluded. In some aspects, the ASR device 202 may account for small changes in the relative position (as well as previous changes in the relative position) to determine when a speaking user may be moving and should be tracked by the ASR device 202 through beamforming techniques and/or signal processing, rather than determining that the audio signals from the user has ended. For example, if a previous utterances or speech segments from the user came from one beam/position and a next speech segment comes from a slightly different beam/position from the same general area, the ASR device 202 may determine that the user is walking relative to the ASR device 202 or other audio input component, and may continue to process audio signals to isolate the speech from the changing relative position of the user by tracking the user. If, however, the speaking user was previously the strongest audio detected by the device and suddenly the strongest audio switches to another source a large distance away from the location of the speaking user, the ASR device 202 may determine that a first speaker has stopped speaking and perform end-pointing based on that determination.

In another aspect, the ASR device 202 may incorporate information from other components (e.g., ASR module 214, beamforming module 218, signal processing module 220, microphone array 204, end-pointing module 216, etc.) of the ASR device 202 in this process. For example, if an audio source suddenly changes from one point to 180 degrees opposite to that point, but a device component indicates that a device has moved or switched orientation, the ASR device 202 may determine that the speech has not concluded, but rather the user may have simply rotated the ASR device. In that event, the ASR device 202 may continue performing ASR on the received audio signals to isolate speech of the user. This aspect, as well as other aspects, may also make use of other directional/orientation components of a device such as a gyroscope, compass, GPS, accelerometer, motion sensing device or other component.

During speech detection, using one or more of the techniques described above, the end-pointing module 216 may determine a confidence level whose value corresponds to a likelihood that speech is actually present in the audio input. If the confidence level satisfies a confidence level threshold, it may be determined that speech is present in the audio signals. However, if the confidence level does not satisfy the confidence level the end-pointing module 216 may determine that there is no speech in the audio signals. In another aspect, the ASR device 202 may combine techniques described herein with speaker identification techniques to identify the speaker whose speech is being processed. When speech from a particular speaker is no longer received from the beamformed audio, the ASR device 202 may determine that a desired speech segment has concluded.

Figure 4:
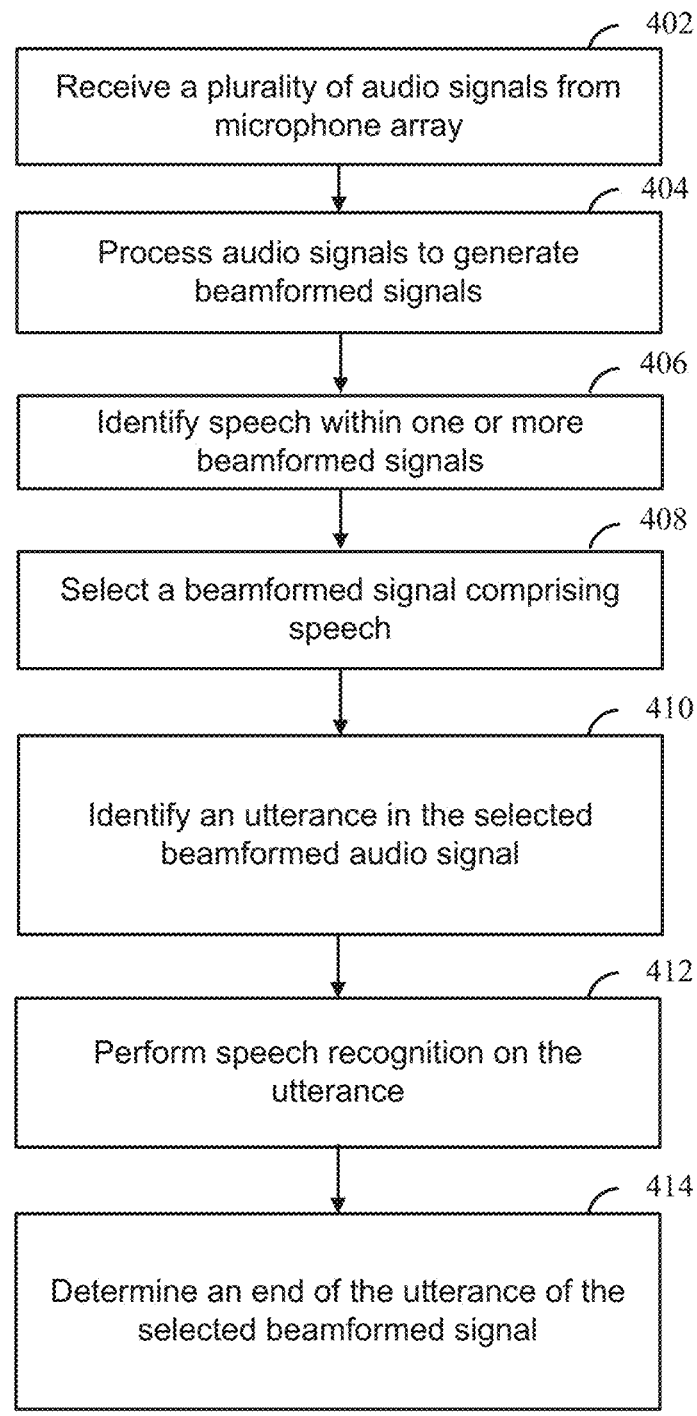
FIG. 4 is a flow diagram illustrating a process for isolating speech from audio signals according to one aspect of the present disclosure.

FIG. 4 is a flow diagram illustrating a speech isolation process for speech recognition according to one aspect of the present disclosure. An ASR device receives a plurality of audio signals from a microphone array, as illustrated in block 402. The ASR device processes the received plurality of audio signals to generate one or more beamformed signals, as illustrated in block 404. The ASR device identifies speech within the one or more beamformed signals, as illustrated in block 406. The ASR device selects a beamformed signal comprising speech, as shown in block 408. The ASR device then identifies an utterance in the selected beamformed audio signal, as shown in block 410. The ASR device then performs speech recognition on the utterance, as shown in block 412. The ASR device may also determine an end of the utterance, as shown in block 414.

In certain situations one or more beams may include audio corresponding with speech of a single user. In other situations one or more beams may include audio corresponding with speech of more than one user. An ASR device may isolate beams including speech and processed the desired speech from among those beams. For example, if a user is joined in a room by another user who is speaking, the ASR device may employ beamforming techniques to isolate the second user's speech in addition to the first user's speech. If the ASR device determines that only the first user's speech should be processed, the ASR device may concentrate its processing on only the beam(s) which include the first user's speech, even if the second user is louder than the first. If, however, the ASR device determines that the second user's speech should also be processed, the ASR device may also concentrate its processing on the beam(s) which include the second user's speech and may perform processing on that speech as well. The processing of speech of multiple users may occur sequentially or substantially/relatively simultaneously.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the ASR techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise. Certain acts, events, or functions of any of the routines or algorithms described herein can be performed in a different sequence, can be added, merged, or left out altogether (e.g., not all described operations or events are necessary for the practice of the algorithm). Moreover, in certain aspects, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the aspects disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more aspects or that one or more aspects necessarily include logic for deciding, with or without author input or prompting, whether these features, elements and/or steps are included or are to be performed in any particular aspect of the disclosure. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain aspects require at least one of X, at least one of Y and at least one of Z to each is present.

While the above detailed description has shown, described, and pointed out novel features as applied to various aspects, it can be understood that various omissions, substitutions, and changes in the form and details of the devices or algorithms illustrated can be made without departing from the spirit of the disclosure. As can be recognized, certain aspects of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system, comprising:
   at least one processor; and
   at least one computer-readable medium encoded with instructions which, when executed by the at least one processor, cause the system to:
   receive audio signals from a microphone array, the audio signals representing at least first speech of a first user,
   determine, using the audio signals, that first audio originated from a first direction,
   process the audio signals to generate a first audio signal corresponding to the first direction,
   determine, based on at least one characteristic of the first audio signal, that the first audio signal represents second speech of the first user, and
   based at least in part on determining that the first audio signal represents the second speech, cause speech recognition processing to be performed using the first audio signal to determine first text corresponding to at least a portion of the second speech.

2. The system of claim 1, wherein the at least one computer-readable medium is encoded with additional instruction which, when executed by the at least one processor, further cause the system to:
   determine, using the audio signals, that second audio originated from a second direction;
   process the audio signals to generate a second audio signal corresponding to the second direction;
   determine, based on at least one characteristic of the second audio signal, that the second audio signal represents a sound other than speech of the first user; and
   based at least in part on determining that the second audio signal represents the sound, refrain from performing speech recognition processing using the second audio signal.

3. The system of claim 2, wherein the sound overlaps in time at least partially with the second speech.

4. The system of claim 3, wherein the second speech begins before the sound.

5. The system of claim 1, wherein the at least one computer-readable medium is encoded with additional instruction which, when executed by the at least one processor, further cause the system to:
   determine, using the audio signals, that second audio originated from a second direction;
   process the audio signals to generate a second audio signal corresponding to the second direction; and
   determine, based on at least one characteristic of the second audio signal, that the second audio signal represents third speech of a second user, the third speech being louder than the second speech, and overlapping in time at least partially with the second speech.

6. The system of claim 5, wherein the at least one computer-readable medium is encoded with additional instruction which, when executed by the at least one processor, further cause the system to:
   refrain from performing speech recognition processing using the second audio signal.

7. The system of claim 5, wherein the at least one computer-readable medium is encoded with additional instruction which, when executed by the at least one processor, further cause the system to:

perform speech recognition processing using the second audio signal to determine second text corresponding to at least a portion of the third speech.

8. The system of claim 1, wherein the at least one computer-readable medium is encoded with additional instruction which, when executed by the at least one processor, further cause the system to:
determine, based on at least one characteristic of the first audio signal, an end point of the second speech.

9. The system of claim 8, wherein the at least one computer-readable medium is encoded with additional instruction which, when executed by the at least one processor, further cause the system to:
determine the end point at least in part by determining that the first audio signal has ceased to indicate a presence of the second speech.

10. The system of claim 1, wherein the at least one computer-readable medium is encoded with additional instruction which, when executed by the at least one processor, further cause the system to:
determine that the first audio has begun originating from a second direction;
process the audio signals to generate a second audio signal corresponding to the second direction; and
perform speech recognition processing using the second audio signal to determine second text corresponding to at least a further portion of the second speech.

11. A method, comprising:
receiving audio signals from a microphone array, the audio signals representing at least first speech of a first user;
determining, using the audio signals, that first audio originated from a first direction;
processing the audio signals to generate a first audio signal corresponding to the first direction;
determining, based on at least one characteristic of the first audio signal, that the first audio signal represents second speech of the first user; and
based at least in part on determining that the first audio signal represents the second speech, causing speech recognition processing to be performed using the first audio signal to determine first text corresponding to at least a portion of the second speech.

12. The method of claim 11, further comprising:
determining, using the audio signals, that second audio originated from a second direction;
processing the audio signals to generate a second audio signal corresponding to the second direction;
determining, based on at least one characteristic of the second audio signal, that the second audio signal represents a sound other than speech of the first user; and
based at least in part on determining that the second audio signal represents the sound, refraining from performing speech recognition processing using the second audio signal.

13. The method of claim 12, wherein the sound overlaps in time at least partially with the second speech.

14. The method of claim 13, wherein the second speech begins before the sound.

15. The method of claim 11, further comprising:
determining, using the audio signals, that second audio originated from a second direction;
processing the audio signals to generate a second audio signal corresponding to the second direction; and
determining, based on at least one characteristic of the second audio signal, that the second audio signal represents third speech of a second user, the third speech being louder than the second speech, and overlapping in time at least partially with the second speech.

16. The method of claim 15, further comprising:
refraining from performing speech recognition processing using the second audio signal.

17. The method of claim 15, further comprising:
performing speech recognition processing using the second audio signal to determine second text corresponding to at least a portion of the third speech.

18. The method of claim 11, further comprising:
determining, based on at least one characteristic of the first audio signal, an end point of the second speech.

19. The method of claim 18, wherein determining the end point comprises determining that the first audio signal has ceased to indicate a presence of the second speech.

20. The method of claim 11, further comprising:
determining that the first audio has begun originating from a second direction;
processing the audio signals to generate a second audio signal corresponding to the second direction; and
performing speech recognition processing using the second audio signal to determine second text corresponding to at least a further portion of the second speech.

* * * * *